Oct. 13, 1964  J. PAWL  3,152,420
INSECT TRAP
Filed Oct. 15, 1962  2 Sheets-Sheet 1

INVENTOR.
JOHN PAWL
BY Charles S. Penfold
ATTORNEY

Oct. 13, 1964
J. PAWL
3,152,420
INSECT TRAP
Filed Oct. 15, 1962
2 Sheets-Sheet 2
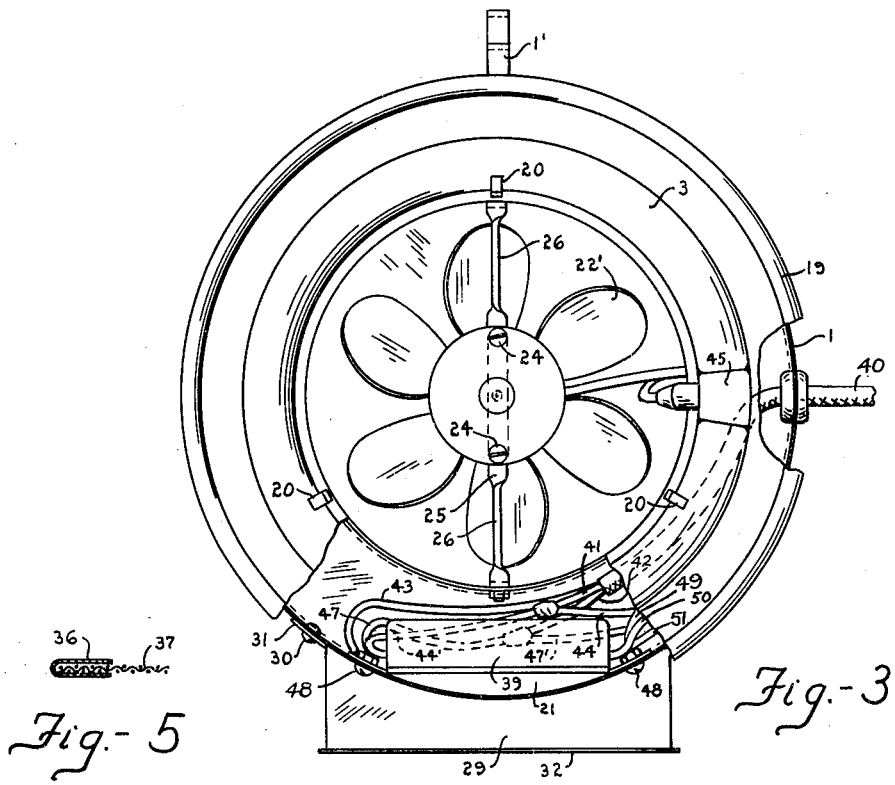
Fig.-3
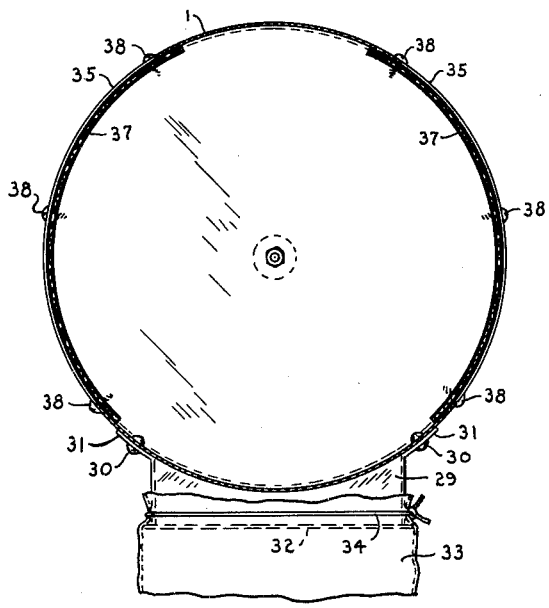
Fig.-4
Fig.-6
INVENTOR.
JOHN PAWL
BY
Charles S. Penfold
ATTORNEY

United States Patent Office 3,152,420
Patented Oct. 13, 1964

3,152,420
INSECT TRAP
John Pawl, Rtes. 30 and 55, Crown Point, Ind.
Filed Oct. 15, 1962, Ser. No. 230,390
2 Claims. (Cl. 43—139)

The subject invention relates generally to traps and more particularly is directed to a machine for trapping insects.

One of the principal objects of the invention is to provide a machine which preferably includes an outer tubular housing, an inner tubular casing, a chamber, means for attracting the insects, and a fan in the casing for directing or sucking the insects therethrough for deposit in the chamber and discharge from the machine.

A particular object of the invention is to provide a machine of the character above described in which the casing is preferably comprised of an inner cylindrical tubular extremity within which an attraction means preferably in the form of an annular lamp is detachably mounted.

A specific object of the invention is to mount a unit comprising the fan and a motor or power means in the casing so that the motor is located adjacent a junction between the inner and outer extremities of the casing and the fan is disposed in the inner tubular extremity of the casing.

Another object of the invention is to provide a machine of the above character in which the inner extremity of the casing is supported by an annular wall or partition which also constitutes a wall of the chamber.

An additional object of the invention is to provide a machine in which the housing thereof is provided with a pair of screened side openings whereby to facilitate escapement of air and at the same time allow the insects to fall into the chamber and through an outlet provided therefor.

Other objects of the invention reside in providing a machine which offers advantages with respect to manufacture and assembly, efficiency, compactness, stability and durability.

Additional objects and advantages of the invention will become apparent after the description hereinafter set forth is considered in conjunction with the drawings annexed hereto.

In the drawings:

FIGURE 3 is a front elevational view of the machine;

FIGURE 4 is a vertical section taken through the rear part of the machine to illustrate the structural details of screened opennigs provided therein;

FIGURE 5 is a partial transverse section showing a detail of a screen unit; and

FIGURE 6 is a vertical section of a modified machine.

Figure 1:
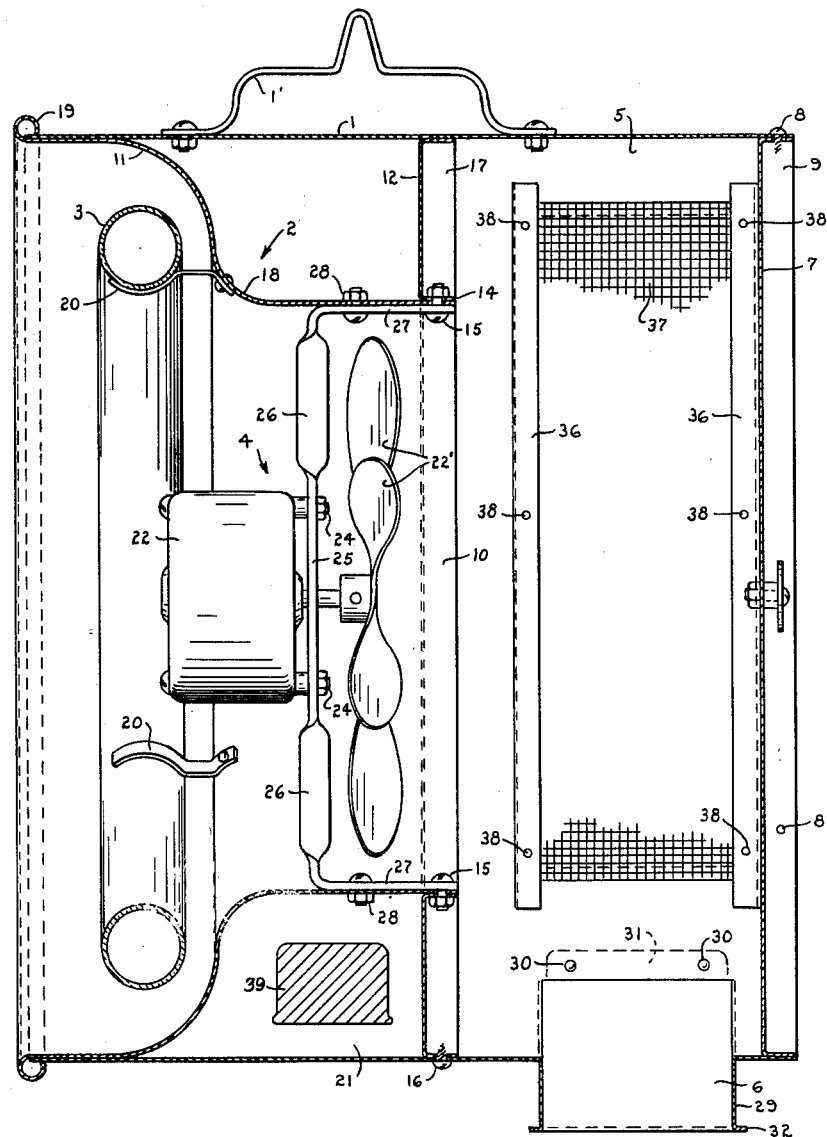
FIGURE 1 is a vertical section taken through the machine to illustrate the operative relationship of its components.
Figure 2:
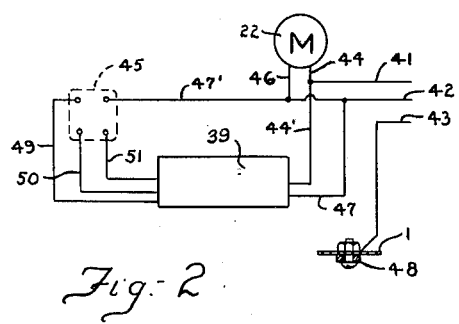
FIGURE 2 is a wiring diagram of the electrical system.

Referring first to the disclosure in FIGURES 1 through 5 of the drawing, the machine, among other things comprises an outer large tubular cylindrical housing or shell, an inner smaller casing generally designated 2, which supports an attraction means 3, a motor and fan unit generally designated 4, a chamber 5 for receiving insects, and a discharge opening or outlet 6.

The housing 1 is preferably made cylindrical to facilitate its manufacture and connection with other parts of the machine and provided with means, such as a fitting or handle 1' for convenience in carrying the machine or mounting it on a support, such as a post in a yard where insects abound. Obviously, the underside of the machine could be provided with a bracket, in addition to, or in lieu of the handle for supporting the machine. The rear end of the housing is closed off by a planar end wall of closure 7, which is preferably detachably secured within the confines of the housing by means of screws 8 which extend through the housing into holes provided therefor in an out-turned axial flange 9. This cover when removed affords convenient access to the majority of the components arranged in the housing and casing.

The casing 2 may be designed and constructed in various ways, but as exemplified herein preferably comprises an inner tubular cylindrical extremity 10 and an outer enlarged concave extremity 11. The inner extremity 10 is of a smaller diameter than the housing and preferably supported concentrically therein by an annular wall or partition 12 having a large central aperture therein defined by an inner annular rearwardly extending axial flange 14. The partition 12, in combination with the housing and cover 7 define the chamber 5, above referred to, for receiving the insects which are to flow rearwardly through the casing. Bolts 15 are preferably used to detachably secure the axial flange 14 against the external surface of the extremity 10 of the casing and screws 16, detachably secure an outer rearwardly extending annular flange 17 of the partition against the internal surface of the housing wall, all of which is clearly depicted in FIGURE 1.

The enlarged and fore extremity 11 of the casing is preferably made concave or dished, and highly polished or provided with a coating of suitable reflectible material so that such extremity constitutes a reflector for directing or dispersing rays of light forwardly in advance of the machine which emanate from the attraction means 3. This attraction means is preferably in the form of a circular lamp of a special type for producing what is known in the trade as black light having the phenomenon of attracting insects. The enlarged extremity of the casing is joined to the inner extremity by a convex portion or junction 18, and includes a cylindrical portion which snugly engages the housing to support this extremity and facilitate centering of the smaller inner extremity for connection to the partition 12. The cylindrical portion of the enlarged extremity is provided with an outwardly extending bead 19 which receives the fore edge portion of the housing. The junction 18 is provided with forwardly extending spring clips 20 which detachably receive and support the circular lamp in concentric spaced relation to the housing as well as with respect to both extremities of the casing so that incoming insects drawn into the machine by the fan will readily find their way around and through the lamp and through the casing to the chamber 5 for expulsion therefrom.

The housing, casing and partition form an annular space 21 within which a transformer and related components of the electrical system are disposed and these will be described subsequently.

The power means or unit generally designated 4, preferably in the form of an electric motor 22 and fan 22', is connected to a vertically disposed bracket 23 by bolts 24. The bracket includes a central planar portion 25 through which the bolts 24 extend and a pair of adjacent corresponding planar portions 26 disposed normal to the direction of the flow of air so as not to appreciably interfere with its free flow. The bracket also includes a pair of rearwardly extending offset portions 27 which are detachably connected against the inner surface of the inner extremity 10 of the casing by the bolts 15 and additional bolts 28 to firmly anchor the bracket in place. The central portion of the bracket is also provided with an aperture (not shown) through which a shaft of the motor 22 extends so that the fan and motor are disposed on opposite sides of the bracket. The vertical part of the bracket which extends diametrically in the inner extremity 10 is preferably located substantially midway of this extremity and supports the motor in concentric spaced relation generally between the inner and outer extremities of the casing and the fan in the rear of the inner extremity. This organization has proven desirable because the insects are drawn through an annular space about the motor before being subjected to a fan 22'. This factor of locating the fan at the rear of the motor is important as the suction and flow of the air through the machine is improved and the insects are stunned, cut, and/or mashed at an appropriate location for falling into the chamber. The fan in some conventional machines is located at the entrance end thereof. This has not proven entirely satisfactory because the insects are stunned, cut, and/or mashed by the fan before they substantially reach the chamber. This results in coating the reflector and other internal surfaces of the machine with a messy layer of macerated insects, thereby rendering the machine less efficient.

The bottom of the chamber 5 or housing wall is provided with an arcuate cut-out which defines the outlet 6. A vertical depending chute or offset duct 29 is secured by rivets 30 to the housing in communication with the outlet 6. These rivets extend through laterals 31 of the duct into the housing wall. The free end of the duct is provided with an out-turned flange 32 to facilitate detachable connection of a container or sack 33 thereabout by a cord 34. The outlet is relatively large and takes up a large area in the bottom of the chamber so that the insects will more or less fall directly into the container without collecting or packing in the chamber.

The housing is also preferably provided with a pair of corresponding diametrically disposed side openings 35 formed by cutting out arcuate portions of the housing. Each of these side openings is preferably covered by an arcuate screen unit comprised of a pair of parallel frame members 36 and a screen 37 having side edges clamped or anchored in the frame members as depicted in FIGURE 5. Each screen unit is detachably secured against the inner surface of the housing over an opening by a plurality of screws 38, or equivalent means, which extend through the housing wall into threaded apertures provided therefor in the frame members. The screened openings allow passage of air while retaining the insects for deposit in the container 33. The screened openings are of a size to insure a free flow of air through the machine without creating any back pressure in the casing. It will be observed that the screened openings are also so located in relation to the outlet 6 that any insects collecting on the inner surfaces of the screens 33 and the cover 7 will eventually substantially fall directly into the outlet. The container is preferably made of a transparent plastic material and when sufficiently filled with insects can be readily detached and destroyed and a new container installed.

The electrical system as best exemplified in FIGURES 1 and 3 includes, among other things, the motor 22 and a transformer 39, above referred to, which are disposed in the annular space 21, and an extension cord 40 provided with a plug (not shown) for connection with a source of electricity. Three conductors 41, 42 and 43 constitute the cord 40. The conductor 41 is connected to the motor 22 by a branch conductor 44 and to the transformer 39 by a branch conductor 44'; conductor 42 to a socket terminal unit 45 of the lamp 3 and to the motor and transformer 39 respectively through branch conductors 46 and 47 and the unit 45 by a branch conductor 47'; and the conductor 43, constituting a ground connection, to one of a pair of bolts 48 detachably connecting the transformer to the housing. Three conductors 49, 50 and 51 are respectively connected to the transformer and to terminals on the unit 45.

Referring to the modified structure illustrated in FIGURE 6 of the drawing, there is shown a housing in which a casing 100 is disposed. This casing has an inner cylindrical extremity 101 and an enlarged annular concave extremity 102 which extremities correspond to those of the casing 2 above referred to. This modified structure differs from the structure above described by reversing the position of the motor and fan unit, which unit is carried by a bracket 103 in a manner whereby a motor 104 is located at the rear of a fan 105, in the rear end of the extremity 101 and the fan is disposed at the junction between the extremities of the casing and between the bracket and an annular lamp 106.

Having thus described my invention it is to be understood that various modifications of the invention may be utilized without departing from the spirit of the invention, hence I do not wish to be limited to the exact forms, constructions or arrangements herein illustrated and described.

I claim:

1. A trap for insects comprising an open ended tubular housing of substantially uniform diameter, an imperforate cover closing off a rear end of the housing, a one-piece tubular casing disposed in the housing and having an inner reduced extremity disposed substantially midway of the length of the housing and also having an outer enlarged extremity supported substantially within the confines of a fore end of the housing, a substantially annular bulb disposed within and carried by said enlarged extremity, a partition disposed in the housing in parallel relation to the cover and serving to support the inner extremity of the casing, said housing, cover and partition in combination forming a chamber for receiving insects, said housing being provided with a lower outlet and screened side openings, and a unit comprising a motor and a fan with the fan disposed entirely within the confines of the inner extremity of the casing for directing air through the casing into the chamber.

2. The trap defined in claim 1, in which said housing, said partition, and said casing, in combination define an annular space substantially surrounding said reduced extremity of said casing whereby electrical components may be disposed in said space.

References Cited in the file of this patent

UNITED STATES PATENTS

| | | |
|---|---|---|
| 738,184 | Goodwin | Sept. 8, 1903 |
| 959,155 | Nault | May 24, 1910 |
| 2,780,026 | Dail et al. | Feb. 5, 1957 |
| 2,893,161 | Reid | July 7, 1959 |
| 3,041,773 | Gagliano | July 3, 1962 |

FOREIGN PATENTS

| | | |
|---|---|---|
| 834,093 | Great Britain | May 4, 1960 |